United States Patent [19]
Takeuchi et al.

[11] 3,850,562
[45] Nov. 26, 1974

[54] APPARATUS FOR PRODUCING HOLLOW MOLDED ARTICLES

[75] Inventors: Setsuyuki Takeuchi; Nobukuni Ibe, both of Hanishina-gun; Fumio Iriko, Tokyo; Yoshihiko Yuzawa, Yokohama, all of Japan

[73] Assignees: Showa Denko Kabushiki Kaisha; Nissei Plastics Industrial Co., Ltd.

[22] Filed: Jan. 24, 1973

[21] Appl. No.: 326,392

[30] Foreign Application Priority Data
Jan. 29, 1972 Japan............................... 47-10902
Jan. 29, 1972 Japan............................... 47-10903

[52] U.S. Cl..................... 425/242 B, 425/DIG. 208, 425/DIG. 209, 425/DIG. 211, 425/DIG. 213, 425/DIG. 216, 425/324 B
[51] Int. Cl............................................ B29d 23/03
[58] Field of Search.......... 425/DIG. 209, DIG. 203, 425/DIG. 211, DIG. 213, DIG. 216, DIG. 208, 242 B, 324 B, 342, 387 B

[56] References Cited
UNITED STATES PATENTS

| | | | |
|---|---|---|---|
| 3,100,913 | 8/1963 | DeMatteo | 425/DIG. 209 |
| 3,212,130 | 10/1965 | Elphee | 425/324 B |
| 3,609,803 | 10/1971 | Fattori | 425/DIG. 209 |
| 3,616,491 | 11/1971 | Vollers | 425/DIG. 209 |

*Primary Examiner*—Richard B. Lazarus
*Attorney, Agent, or Firm*—Ostrolenk, Faber, Gerb & Soffen

[57] ABSTRACT

Apparatus for producing hollow molded articles includes means for injecting thermoplastic material into a mold cavity formed by a core, neck mold, and cavity mold to form a parison. The core is then released from the cavity mold and the parison, and the latter, while still attached to the neck mold is released from the cavity mold and moved by a transferring device to an intermittently operated rotatable carrier. This carrier moves the parison and neck mold to a station where a stretching rod is inserted into the parison. The parison is then reheated close to its melting temperature, and thereafter the parison is stretched in one direction and is blown in a blow mold to form a hollow molded article.

14 Claims, 13 Drawing Figures

APPARATUS FOR PRODUCING HOLLOW MOLDED ARTICLES

This invention relates to a method and apparatus for producing injection blow molded articles from thermoplastic materials. More particularly, the invention relates to the method and apparatus in which the molded articles are imparted with biaxial stretching giving several excellent properties.

It is well known to those skilled in the art that the mechanical properties of molded articles of thermoplastic materials such as polyethylene, polypropylene and polystyrene can be very much improved when they are caused to stretch in both longitudinal and lateral directions owing to the modification of the molecular disposition.

Further, in order to obtain the products with improved strength and transparency by the above consideration, several attempts to impart the biaxial stretching to the thermoplastic molded articles have been made in the technical field of blow molding. Therefore, the art itself to impart the biaxial stretching to the thermoplastic articles is not novel. However, when the injection molding and blow molding are carried out in series, though the method is theoretically possible and has been successful in the experimental stage, there remain many problems in the continuous production process to produce a large number of such molded products.

The largest one in such problems is that the parison can not be stretched directly in two directions if it is not detached from the core which is used in the injection stage. In the conventional injection blow molding method without giving the biaxial stretching, the parison is only stretched substantially at a right angle with respect to the core to form the product such as a bottle, so that the difficulty owing to the adhesion to the core is scarcely encountered. In biaxial stretching, however, the parison is stretched in the axial direction before the stretching in the lateral direction, in which the difficulty of the stretching in the axial direction is caused by the adhesion between the core and the parison.

Therefore, one object of the present invention is to propose a novel method and apparatus for producing the molded articles in which the core as used to form the parison by injection molding is exchanged easily by a narrower stretching rod and after the re-heating of the parison, it can be imparted with the biaxial stretching in the predetermined operation cycle.

Further, the invention proposes the method and apparatus for producing hollow molded articles in which the parison formed in the injection stage is transferred to the intermittently rotating turntable before the next injection cycle, and the parison is thereafter re-heated, stretched and blown in the succeeding steps.

Furthermore, the invention proposes the method and apparatus for producing hollow molded articles in which the parison which is formed in the injection stage is held by a neck mold, said neck mold is transferred together with the parison, and the core in the parison is then exchanged with a narrower stretching rod.

Still further, the invention proposes the method and apparatus for producing hollow molded articles in which the injection molded parison is passed through a plurality of operation stages provided on the periphery of the turntable at regular intervals, and is caused by biaxial stretching to form a blow molded product.

Pursuant to the above object of the present invention, the principal feature of the method of the invention comprises the steps of: injecting thermoplastic material into a mold cavity formed by a core, neck mold and cavity mold to form the parison; releasing said core from the cavity mold and the parison, and further releasing said parison attached with the neck mold from the cavity mold; transferring said parison being held by the neck mold by a transferring device and inserting a stretching rod having air blowing means into said parison; re-heating said parison close to the melting temperature thereof; and stretching said parison in one direction and, simultaneously with or after said stretching step, blowing said parison in a blow mold to form the hollow molded article.

The various features and advantages of the invention may be fully understood from the drawings, which illustrate the specific embodiments of the invention, and the following description thereof. In the drawings.

Figure 1:
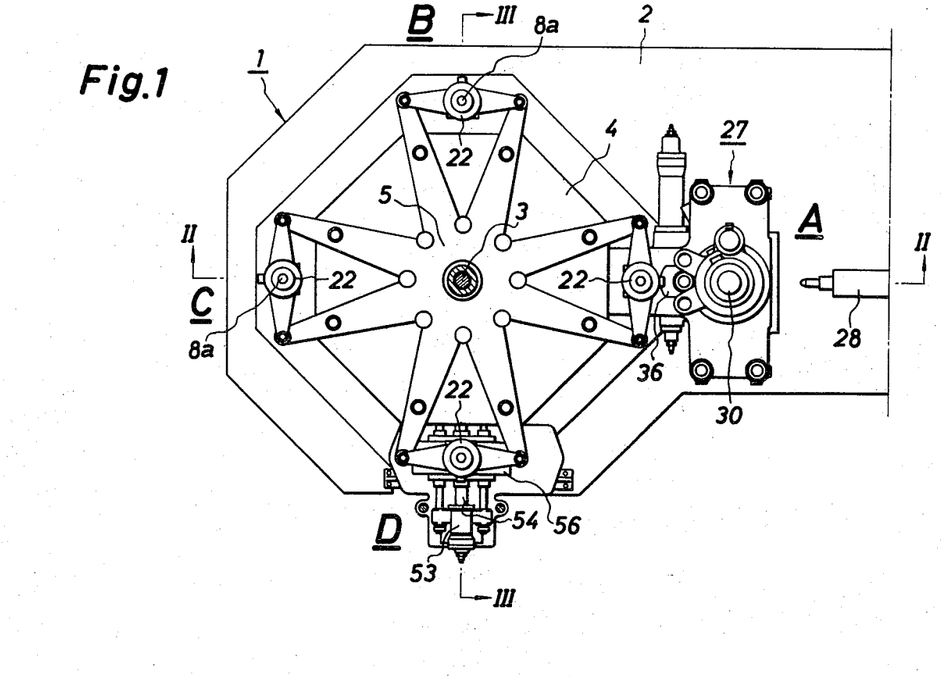
FIG. 1 is a plan view of an embodiment of the apparatus of the present invention.
Figures 2A, 2B:
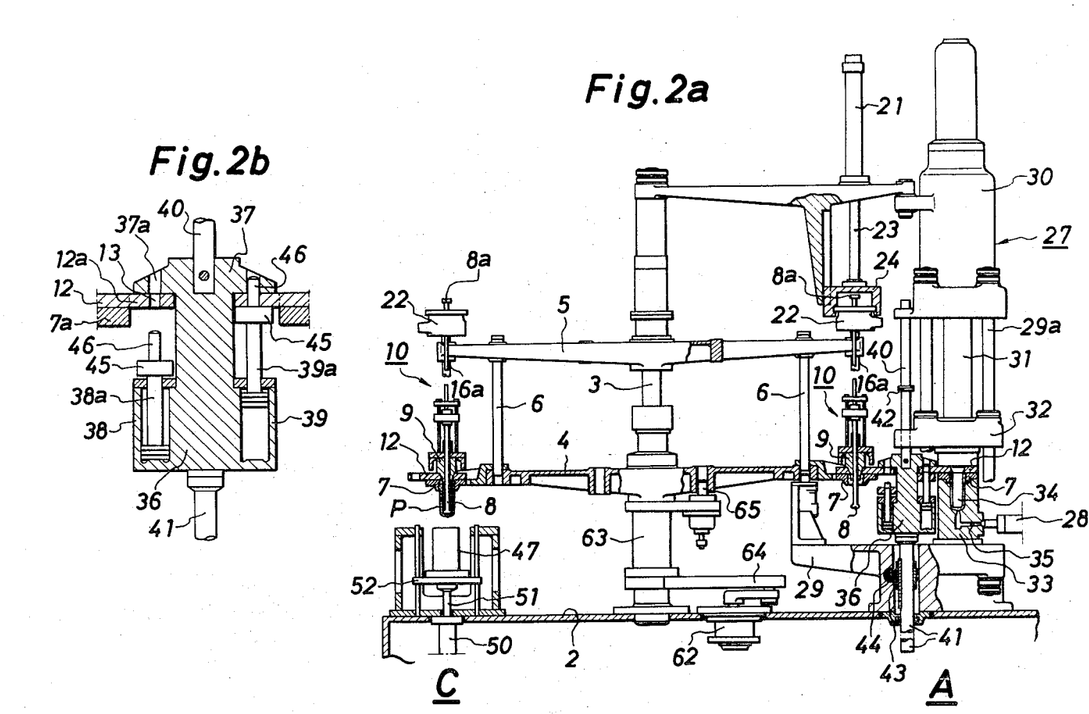
FIG. 2a is a vertical sectional view of the apparatus taken along the line II — II in FIG. 1.
FIG. 2b is also a vertical sectional view of the transferring device of the apparatus.
Figure 3:
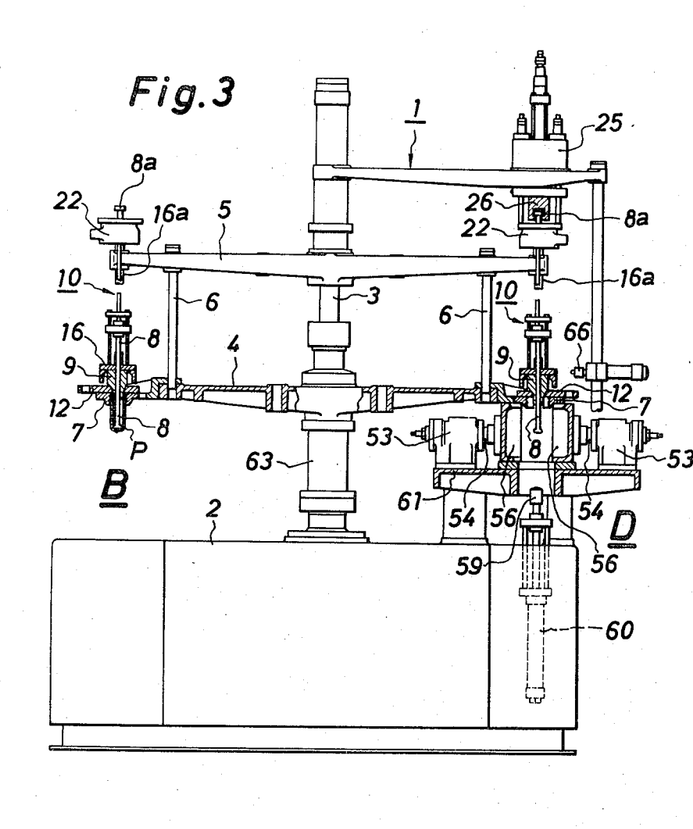
FIG. 3 is a vertical sectional view of the apparatus taken along the line III — III in FIG. 1.

Referring now to the drawings, especially to FIGS. 2a and 3, the apparatus 1 comprises a turntable 4 which is supported by a main post 3 on a base 2, and four stages, which are disposed on the periphery of said turntable 4 at regular intervals, that is, an injection stage A, a cooling stage B, a heating stage C and a stretch-blow stage D.

Rotating member 5, at the top of main post 3, is connected to turntable 4 by means of tie rods 6. Further, said turntable 4 is provided with a plurality of concave portions on its periphery for receiving four neck molds 7, respectively. The four neck-molds 7 are positioned simultaneously at respective stages and received in said concave portions. Above each of said concave portions, is positioned a stretch-blow device 10 which is slidably supported by said upper rotating member 5. In said stretch-blow device 10, a stretching rod 8 to stretch vertically the parison P is received in the center of a blowing block 9. In the drawings, the parisons P having the bottom portions are shown, however, a tubular parison may also be employed, without departing from the scope of the invention, by modifying some relevant members according to the conventional art.

Figure 4:
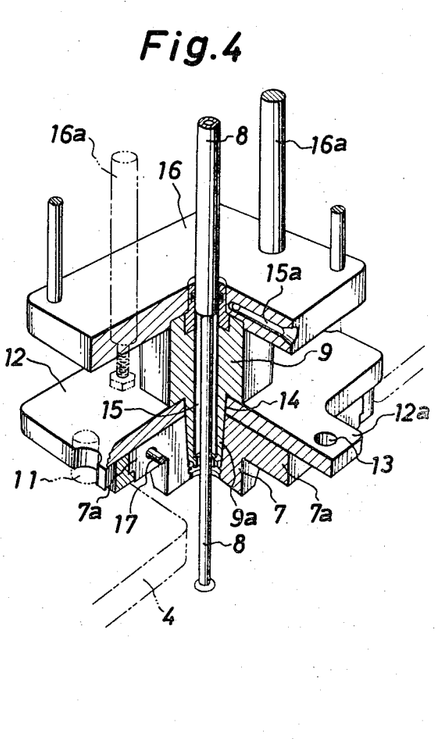
FIG. 4 is a partially sectional perspective view of the mold supporting plate, neck mold and stretching rod.

As shown in FIG. 4, the above-mentioned neck mold 7 is supported on the lower face of a mold supporting plate 12 so as to be moved in the horizontal direction, and said mold supporting plate 12 is placed on the periphery of the concave portion of the turn table 4 and is prevented from moving horizontally by the engagement with the pins 11. In the injection stage A, the neck mold 7 is transferred from the turntable side to the injection mold side, so that the above-mentioned mold supporting plate 12 is integrally provided with a projected piece 12a having apertures 13, and at the center of said mold supporting plate 12 is provided with a larger aperture 14 to receive and pass the blowing nozzle 9a of the lower portion of said blowing block 9 into the neck mold 7 downward.

In order to heat the inside of the parison P obtained in the injection stage A to a porper temperature, a heater (not shown) can be provided within the stretching rod 8 which is projected from the blowing nozzle 9a. The air passage 15 is formed between the stretching rod 8 and the blowing block 9, and the compressed air is introduced from an air passage 15a provided to the upper plate 16, through the blowing nozzle 9a, which holds the neck mold 7, and the parison P, and finally into the parison P to be stretched.

Figures 10, 11:
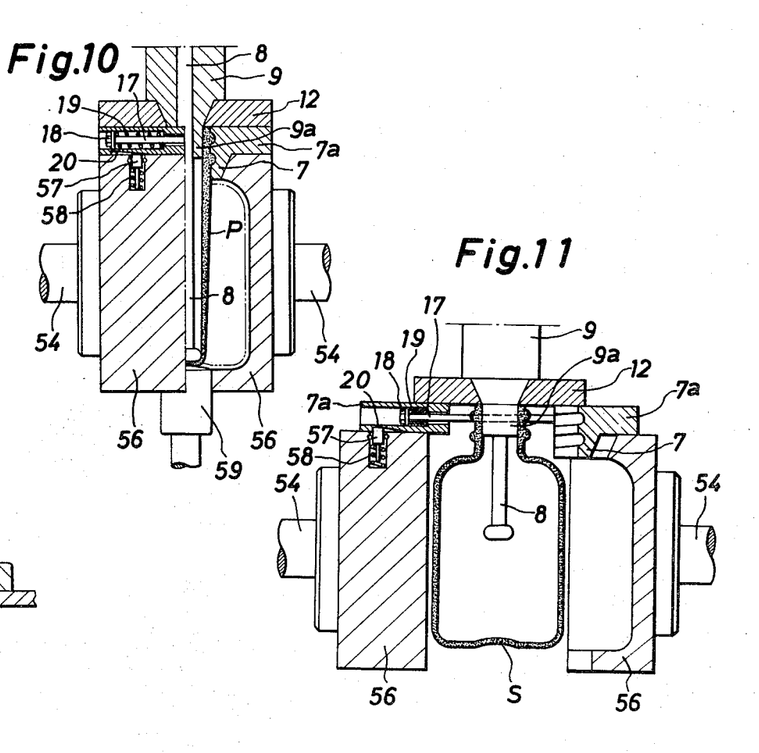
FIGS. 10 and 11 are vertical sectional views of the blow mold showing the stretching of thermoplastic material and mold openings of the blow mold and neck mold.

The above-mentioned neck mold 7 is supported by the mold supporting plate 12 by such means that the both end portions of the neck mold 7 are received into corresponding grooves which are provided on both sides of the lower surface of the supporting plate 12. Said neck mold 7 comprises a pair of mold plates 7a having mold surfaces for the neck portion of the article to be molded on their inner faces, and said mold plates 7a are engaged with each other by means of connecting rods 17, which will be fully understood from FIGS. 4, 10 and 11. Said plates 7a are normally closed by the action of the coil springs 19 between the connecting rods 17 and the nuts 18, and they hold the parison P by the inner faces thereof. However, when the notch 20 having a tapered face on the lower surface of the mold plate 7a is engaged with a proper member and said member is pulled outward, the mold plates 7a can be easily opened against the force of the coil springs 19.

The movement of the stretch-blow device 10 in the vertical direction is caused by the upper hydraulic cylinder 21 positioned in the injection stage A, and this connection is established by connecting a joint member 22 with another joint member 24 at the lower end of a piston rod 23. Said joint member 22 is connected to said plate 16 through a stay 16a on the periphery of the upper portion of the stretching rod 8, and can be joined with the other joint member 24 by sliding the former joint member 22 lateraly into the latter joint member 24. Further, the movement of the stretching rod 8 in the vertical direction is caused by a hydraulic cylinder 25 which is positioned in the upper portion of the stretch-blow stage D. In like manner as in the above stretch-blow device 10, the connection is made by sliding the head 8a at the top end of the stretching rod 8 into a joint 26 from the lateral direction.

The above-mentioned injection stage A is provided with a mold clamping device 27 which is operated vertically by a hydraulic means and an injection device 28 which is disposed horizontally. Said mold clamping device 27 comprises a hydraulic cylinder 30 for mold clamping, and a movable plate 32. Said hydraulic cylinder 30 is supported by a plurality of tie rods 29a which are fixed to a stationary plate 29 and said plate 29 is supported by the base 2 of the apparatus. Said movable plate 32 is guided by said tie rods 29a and is connected to a clamping ram 31 of said hydraulic cylinder. The injection mold for producing the above-mentioned parison P is positioned between this movable plate 32 and said stationary plate 29. The injection mold mainly comprises a cavity mold 33 which is fixed on the stationary plate 29 and facing upward, and a core 34 which is fixed to a mold setting plate positioned on the lower surface of the movable plate 32. The upper surface of the cavity mold 33 is positioned on the same horizontal level of the lower surface of the peripheral portion of said turn table 4, and on this horizontal level, the above-mentioned neck-mold 7 with the mold supporting plate 12 may be aligned. Said core 34 is inserted downward into the cavity mold 33 through the openings of the neck-mold 7 and the mold supporting plate 12, whereby the mold cavity for producing the parison P can be formed. The passage 35 for the thermoplastic material is provided from the lower side surfaceo of the cavity mold 33 to the bottom of the mold cavity, and the nozzle of said injection device 28 is contacted to the open end of said passage 35, enabling the molten thermoplastic material to be fed into the mold cavity.

The device 36 between the above-mentioned turn table 4 and the clamping device 27 is a parison transferring device which is indispensable for the present invention. Said transferring device 36 can be moved in the vertical direction and rotated.

Further, said transferring device 36 comprises, as shown in FIG. 2b in detail, a main portion having an integral square seat 37 at its top portion and a pair of symmetric small hydraulic cylinders 38 and 39 at its lower portion, a shaft 40 being fitted to said top portion, and a rotating shaft 41 being provided vertically from the lower face of said main portion. Thereby, the main portion is supported by said shaft 40 which is slidably inserted into the projecting portion of said movable plate 32, and by said rotating shaft 41 which engages stationary plate 29.

The movement of this transferring device 36 in the vertical direction is caused by the movement of said movable plate 32 by way of a flange 42 which is attached in the middle portion of said shaft 40, so that the transferring device 36 and the movable plate 32 move together to carry out the transferring of the parison P after the mold opening. Further, the rotation of the transferring device 36 is caused by a pinion 43 and a rack 44 where said pinion 43 is fitted to said rotating shaft 41 by using a slide key, and the main portion which is elevated with said movable plate 32, can be reciprocally rotated through an angle of 180°.

Said hydraulic cylinders 38 and 39 which are provided symmetrically on the sides of the rotating table and the injection device, move vertically the piston rods 38a and 39a which have pins 46 and a lower supporting plate 45. The above-mentioned mold supporting plate 12 is held between the seat 37 and lower supporting plates 45. Said pins 46 are inserted into the apertures 13 of the above-mentioned projected piece 12a and apertures 37a of the seat 37, so that the lowering of said projected piece 12a by the weight of the mold supporting plate 12, the neck mold 7 and the parison P can be prevented.

Figure 9:
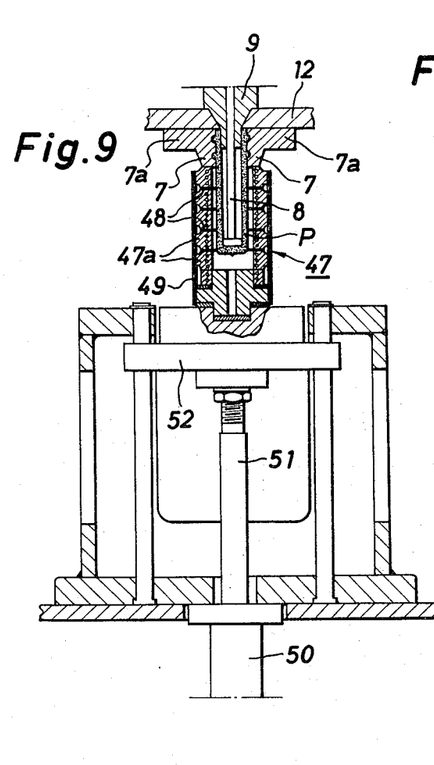
FIG. 9 is an enlarged vertical sectional view of the heating stage.

As shown in FIG. 9, the heating stage C, which is positioned on the other side of said injection stage A, is provided with a cylindrical heating mantle 47, which reheats the parison P held by the neck mold 7 close to its melting temperature. In this heating mantle 47, a plurality of doughnut-like heating blocks 47a made of aluminum alloy and buried with heating elements are piled in layers with the insertions of heat insulating materials 48 such as mica leaves, and the outer surfaces of said blocks 47a are covered by a heat insulating material 49 such as an asbestos sheet. The heating in said heating mantle 47 is effected by radiant heat, and the regulation with regard to each heating block 47a is possible. This heating mantle 47 is fixed to a table 52 which is supported by a piston rod 51 of a hydraulic cylinder 50 mounted on the above-mentioned base 2, and raised by said hydraulic cylinder 50 to the position of the neck mold 7, to move the parison P within said heating mantle 47.

Between this heating stage C and the above-mentioned injection stage A, the stretch-blow stage D is positioned. Stretch-blow stage D is provided with a pair of blow mold halves 56 which can be moved horizontally to the open or closed position and are connected respectively with rams 54 of respective hydraulic operation means 53. Said blow mold 56 is provided with a portion for receiving the neck mold 7 and pins 57 which are actuated by coil springs 58. Each pin 57 is received in the notch 20 of the mold plate 7a of the neck mold 7 to connect the blow mold 56 and the neck mold 7, whereby both mold 56 and 7 are simultaneously opened against the force of the springs 19, which will be understood from FIGS. 10 and 11. Further, the numeral 59 indicates a bottom mold of the blow mold 56 which is operated vertically by a hydraulic cylinder 60, and the numeral 61 is a table for supporting the blow mold 56.

Now the method of the invention will be explained in the following with reference to the aforementioned apparatus.

As disclosed above, turntable 4 transfers the parison P, which is made in the injection stage A, to each of the other stages, so that the rotation thereof is to be intermittent and the neck mold 7 must be transferred and stopped precisely at each stage. In the apparatus 1, the turntable 4 is rotated exactly 90° at each time by a hydraulic motor 62 which is attached to the base 2 through a crank arm 64 which is fixed to a rotating cylinder 63 around the main post 3. The rotation of turntable 4 can be stopped precisely by a hydraulically operated pin 65. All of the hydraulic means provided for the apparatus 1 as well as said devices for the rotation of turntable 4 are synchronized with the molding operation cycle of the above-mentioned injection stage A.

The operation time from the molding of the parison to the release of the hollow molded article is as follows. The operation cycle in the injection stage A is 19 seconds, during which the turntable is stopped. The time of said 19 seconds is made up of mold closing and clamping (3 seconds) - injection (4 seconds) - curing (6 seconds) - mold opening (3 seconds) - and transferring of parison (3 seconds). In this step of the turntable for the period of 19 seconds, the process in other stages must be carried out within this period. The rotation of the turntable to the next stage takes about 1 second, therefore the time to rotate the turn table for 360° is 80 seconds, and it takes 79 seconds from the beginning to the final releasing of the hollow molded article. However, in this apparatus, each of the stages are continually in operation, so that the molded products can be obtained every 20 seconds.

Figure 5:
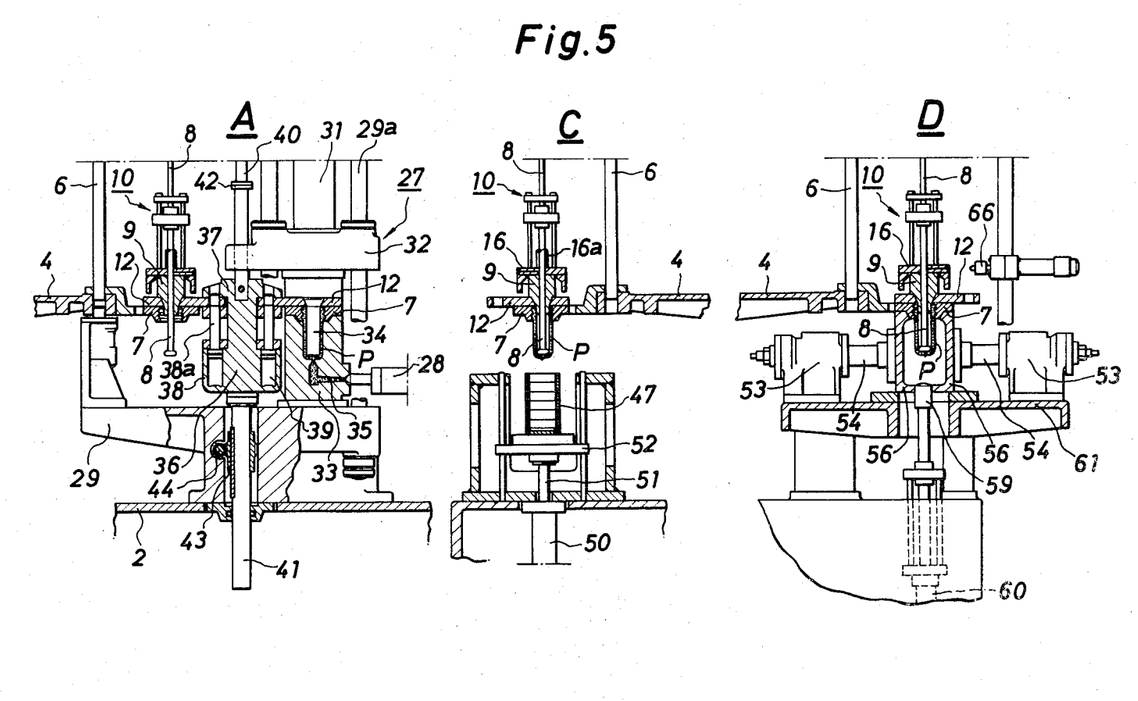
FIGS. 5 to 8 are vertical sectional views of the injection stage, heating stage and stretch-blow stage which showing the operational relations between said stages on the basis of the operational cycle of the injection stage.

As shown in FIG. 5, the molding cycle is started with the injection of thermoplastic material. The foregoing cavity mold 33 is closed by the neck mold 7 and the core 34 through the supporting plate 12 which is held by the seat 37 of the transferring device 36 at the projected piece 12a. By the injection of thermoplastic material, the space around the core 34 as well as the portion of the neck mold 7 is filled with the material to form a parison P. While, in the heating stage C, the parison P which has been formed previously is before the step of re-heating and in the stretch-blow stage D, the parison P is just before the step of blowing with in the closed blow mold 56.

Figure 6:
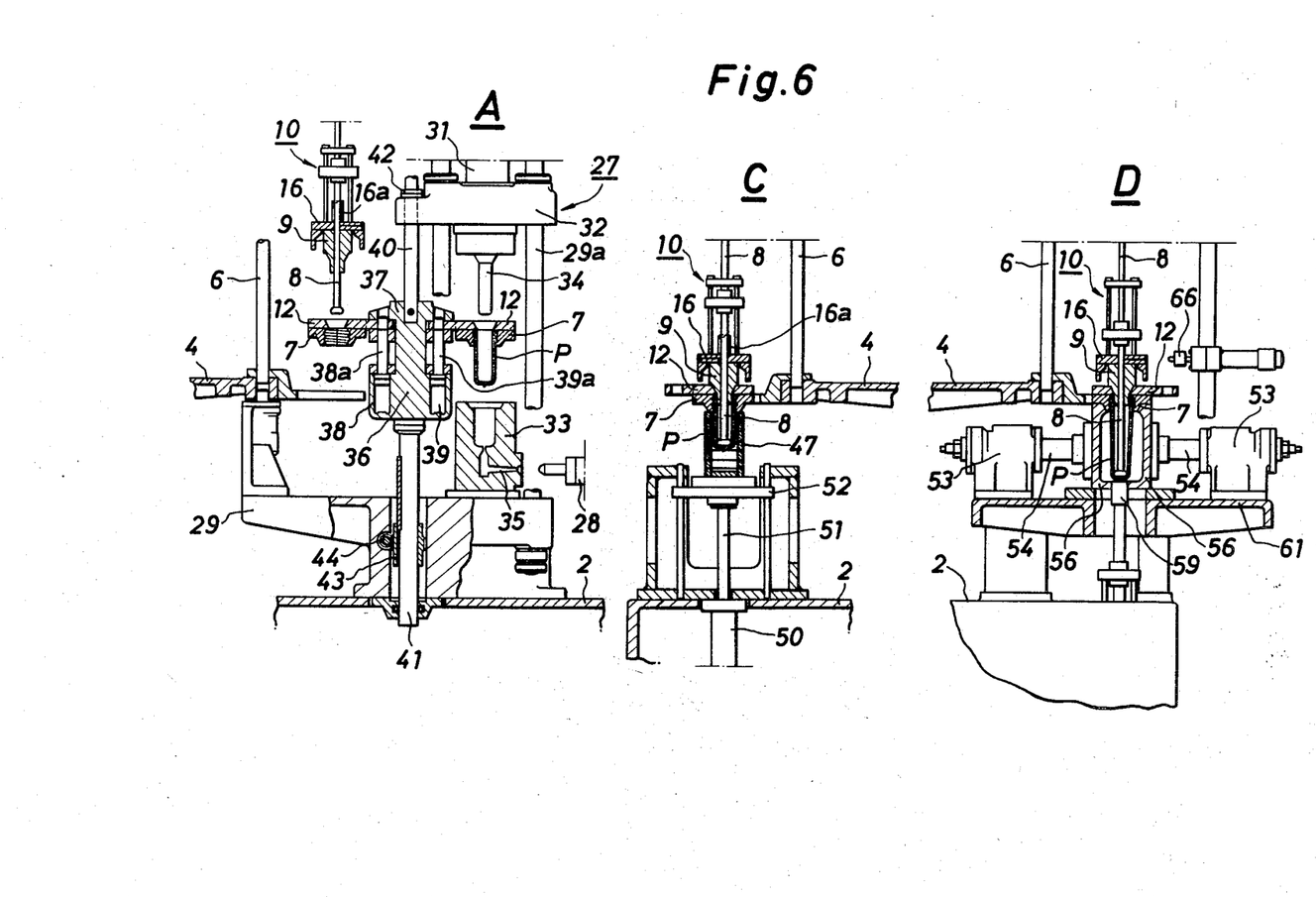

Then after the injection and curing period, the movable plate 32 in the injection stage A is lifted up by operating the mold clamping device 27 to release only the core 34 from the cavity mold 33, and simultaneously with this release of the core 34, the stretching device 10 on the side of turn table 4 is raised by the cylinder 21. The projected portion of said movable plate 32 then pushes against the flange 42 of the shaft 40 of the transferring device 36 and lifts up said device 36 to the upper final position. As a result, as shown in FIG. 6, the supporting plate 12 between the seat 37 and the lower supporting plate 45 is raised together with the neck mold 7, where the formed parison P follows the neck mold 7.

While in the heating stage C, the above-mentioned heating mantle 47 is lifted up to the neck mold 7 by the hydraulic cylinder 50, and the parison P is received within said heating mantle 47 to be re-heated close to its melting temperature. In this step, the parison P is liable to shrink during the heating, however, the bottom portion of the parison P is held by the stretching rod 8, to prevent shrinkage of the parison. Further, in the stretch-blow stage D, the stretching rod 8 is pushed down to the bottom surface of the blow mold by the action of stretching cylinder 25 to stretch the parison P vertically in one direction and said rod 8 holds the bottom portion of the parison P with the above-mentioned bottom mold 59.

Again in the injection stage A, the lifted transferring device 36 is rotated as much as 180° by the rack 44 and the pinion 43 provided on the rotating shaft 41. Thereby, the neck mold 7 having the parison P on the cavity mold side and the other neck mold 7 without the parison on the turn table side are exchanged with each other together with the mold supporting plate 12.

Further, the heating stage C is in the re-heating step, and in the stretch-blow stage D, the air is introduced from the air nozzle 66 through the passage 15 of the blowing block 9 into the stretched parison P, in which said air nozzle 66 is attached to the passage 15a of the plate 16 on said blowing block 9. Thereby the biaxial stretching of the desired blow molding product can be formed.

Figure 7:
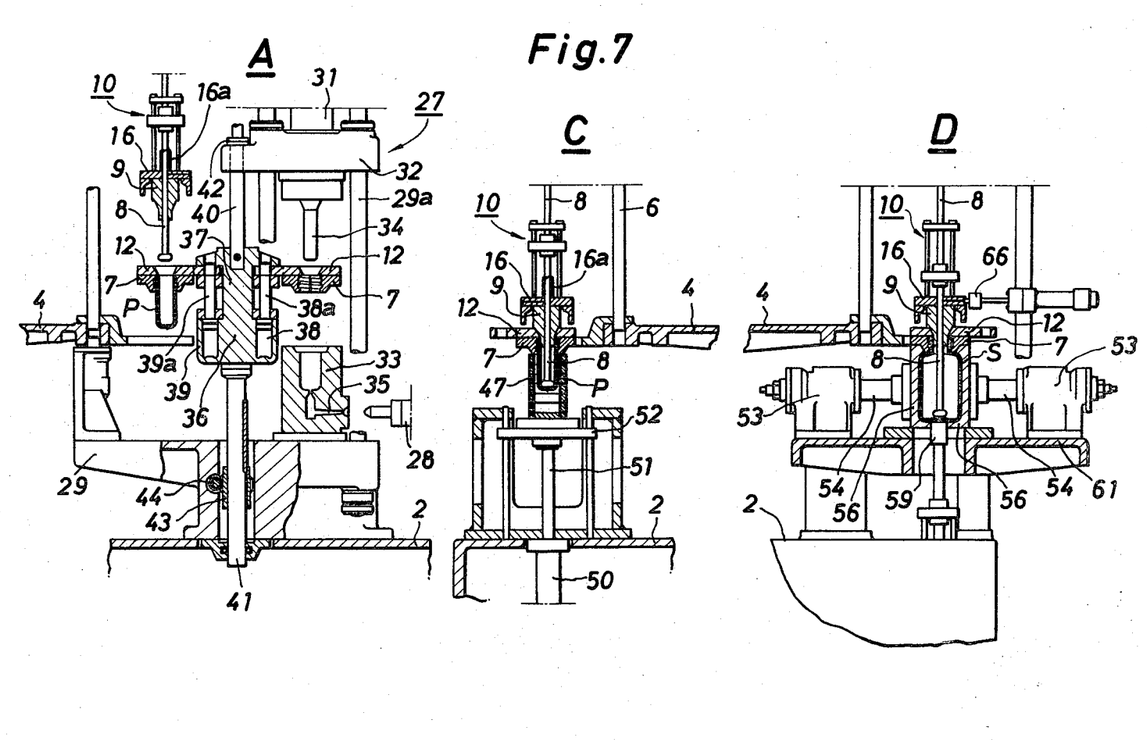
Figure 8:
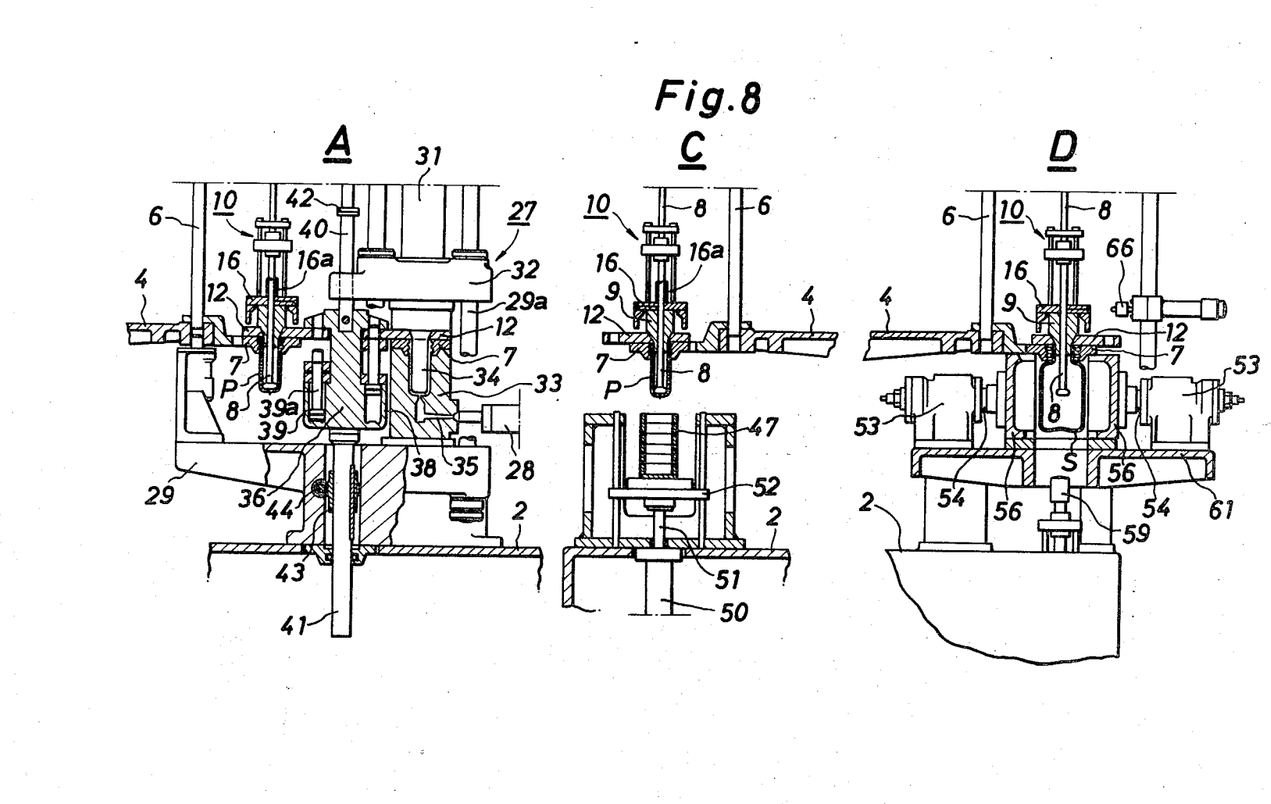

In the injection stage A after the exchange of the neck molds 7, the movable plate 32 is lowered by the action of the hydraulic cylinder 30 of the mold clamping device, and, at the same time, the stretch-blow device 10 is also lowered by the cylinder 21 (see FIG. 7). Further, with the lowering of the movable plate 32, the transferring device 36 is also lowered to the original position. The neck mold 7 holding the parison P is positioned in the peripheral portion of turntable 4, and the other neck mold 7 without the parison P is settled on the upper surface of the cavity mold 33. At almost same time, the respective neck molds 7 are inserted with the core 34 or the stretching rod 8 which is far narrower than said core 34, and the mold closing and clamping of the cavity mold 33 is completed and the setting of stretch-blow device 10 in the turntable side is completed, thus the stretching rod 8 is settled within the parison P. FIG. 8 shows this state of setting, in which the piston rod 39a of the hydraulic cylinder 39 which is transferred to the turntable side, is lowered to release the engagement of the mold supporting plate 12 and allow the rotation of the turntable 4.

While in the heating stage C, the re-heating is finished and the heating mantle 47 is lowered to the original position. Further, in the stretch-blow stage D, the stretching rod 8 is raised again and the pair of blow molds 56 is opened, further the blow molding product S is released from the blow mold 56 and the neck mold 7.

After the completion of each step of the stages, the intermittent rotation of the turntable 4 is caused, so that the formed parison P is transferred to the cooling stage B, the parison in the heating stage C is transferred to the stretch-blow stage D, and the neck mold and the mold supporting plate after the release of the molded article are transferred to the injection stage A, then the mold supporting plate is secured to the transferring device.

Further, in the method of the present invention, the cooling is started from the molding of the parison, and during the passage through the cooling stage B to the heating stage C, the temperature of the parison is lowered to about 90°C.

Accordingly, the time of re-heating is very little because the parison is not cooled to the room temperature which is different from the conventional cold parison, further each heating block of the heating mantle can be regulated separately, the re-heating of the parison can be carried out so as to expect the most suitable operation of the stretching and blowing.

Figure 12:
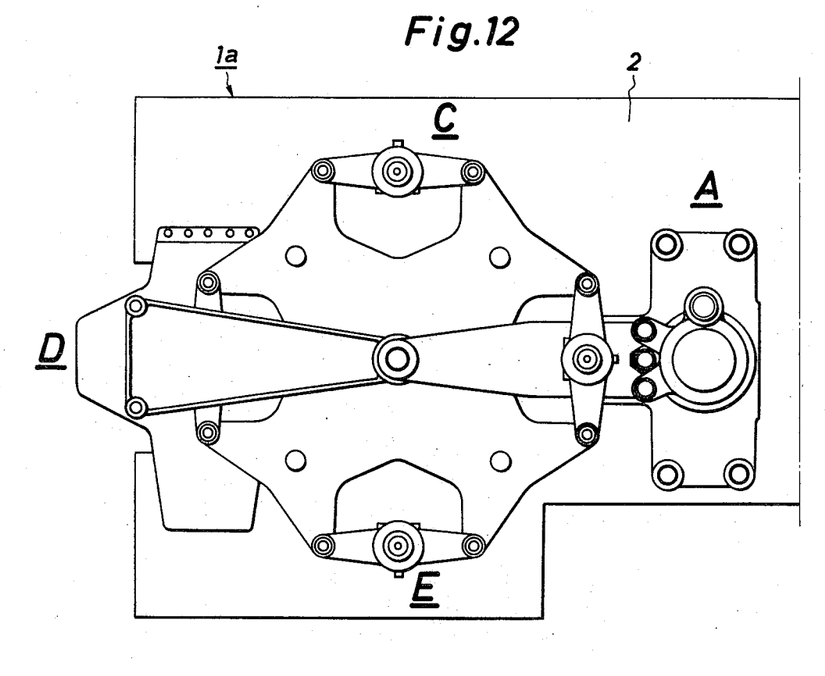
FIG. 12 is a plan view of another embodiment of the apparatus of the invention.

In the meantime, with regard to the embodiment 1a as shown in FIG. 12, the cooling stage is omitted, and it is used in case that the molded parison is cooled to the desired temperature in the injection mold itself. The embodiment 1a comprises the injection stage A, the heating stage C, the stretch-blow stage D and a product release confirmation stage E, in which other devices are similar to those of the foregoing apparatus.

In accordance with the above-mentioned method and apparatus, effective and successful plastic molding can be carried out and excellent products can be obtained. It should be emphasized, however, that the specific embodiments described and shown herein are intended as merely illustrative and in no way restrictive of the invention.

What is claimed is:

1. An apparatus for producing hollow molded articles by injecting thermoplastic material into an injection mold to form a parison, stretching said parison in one direction and simultaneously or thereafter blowing said stretched parison in a blow mold, which comprises:

a base;

an intermittently rotatable turntable mounted on the base and having a plurality of positioning portions in positions corresponding to respective operation stages, a first of said stages being provided with a vertically movable stretch-blow device having a blowing block and a vertical stretching rod;

horizontally separable neck molds attached on the lower surfaces of mold supporting plates, said mold supporting plates being engaged with said positioning portions of said turntable;

a hydraulic mold clamping device provided with an injection mold consisting of a cavity mold attached on a stationary plate, a neck mold fitted on said cavity mold by mold supporting plates, and a core supported by a movable plate to form a mold cavity for a parison, a horizontal injection device to inject thermoplastic material into said mold cavity;

a transferring device at an injection or second one of said stages, said transferring device being vertically movable and rotatable to exchange the neck mold on the injection mold and the mold supporting plate attached to the neck mold on the injection mold with a neck mold and its attached mold supporting plate on the turntable;

a heating mantle in a heating or third one of said stages, said mantle re-heating the cooled parison from the injection stage;

a blow mold provided on the base, said blow mold being separable in the horizontal direction by hydraulic means so as to receive the re-heated parison; and a hydraulic cylinder in a stretch-blow or fourth one of said stages, said cylinder being actuable to stretch said parison to the bottom surface of said mold cavity by depressing said stretching rod.

2. An apparatus for producing hollow molded articles as claimed in claim 1, in which said transferring device is interposed between said turntable and said mold clamping device, and comprises:

a main portion provided with symmetric pins to hold the mold supporting plate under the seat and a pair of hydraulic cylinders to vertically move piston rods holding the lower supporting plate;

a shaft on the upper portion of said main portion to guide movement of the movable plate in the mold clamping device; and a rotating shaft under said main portion to rotate said main portion for 180° by the engagement with a rotating means.

3. An apparatus for producing hollow molded articles as claimed in claim 1, in which the inside of said neck mold is supported on the lower surface of the mold supporting plate and separable in the horizontal direction, said inside of said neck mold being shaped so as to form the neck portion of the hollow molded article and to support said parison for producing the hollow molded article.

4. An apparatus for producing hollow molded articles as claimed in claim 1, in which said mold supporting plate is provided at its center with an aperture to pass means defining a blowing air passage of said fourth stage.

5. An apparatus for producing hollow molded articles as claimed in claim 1, in which the mold supporting plate supports the neck mold which comprises two mold halves engageable with each other to form a mold cavity surface for the neck portion of the hollow article to be molded, said two mold halves being normally closed by the force of coil springs provided on connecting rods for said mold halves, means defining notches having tapered surfaces on the lower surfaces of said mold halves, members engaged with said notches and operable to open the mold halves.

6. An apparatus for producing hollow molded articles as claimed in claim 1, in which the turntable is provided with concave portions each of which is provided on its upper portion with a stretch-blow device consisting of a blowing block and a joint member, said blowing block having a vertically movable stretching rod at the center portion thereof, said stretching rod being narrower than said core and the portion around said stretching rod being connected to the air passage of the upper plate, and said joint member being positioned at the top end of said stretching rod.

7. An apparatus for producing hollow molded articles as claimed in claim 1, in which the upper surface of the horizontall movable blow mold is provided with upward facing projections which operatively engage notches on the lower surface of the neck mold to open the latter.

8. An apparatus for producing hollow molded articles as claimed in claim 2, in which said mold supporting plate is provided at its center with an aperture to pass means defining a blowing air passage of said fourth stage.

9. An apparatus for producing hollow molded articles as claimed in claim 3, in which the mold supporting plate supports the neck mold which comprises two mold halves engageable with each other to form a mold cavity surface for the neck portion of the hollow article to be molded, said two mold halves being normally closed by the force of coil springs provided on connecting rods for said mold halves, means defining notches having tapered surfaces on the lower surfaces of said mold halves, members engaged with said notches and operable to open the mold halves.

10. An apparatus for producing hollow molded articles as claimed in claim 4, in which the mold supporting plate supports the neck mold which comprises two mold halves engageable with each other to form a mold cavity surface for the neck portion of the hollow article to be molded, said two mold halves being normally closed by the force of coil springs provided on connecting rods for said mold halves, means defining notches having tapered surfaces on the lower surfaces of said mold halves, members engaged with said notches and operable to open the mold halves.

11. An apparatus for producing hollow molded articles as claimed in claim 4, in which each of said concave portions of the turntable is provided on its upper portion with a stretch-blow device consisting of a blowing block and a joint member, said blowing block having a vertically movable stretching rod at the center portion thereof, said stretching rod being narrower than said core and the portion around said stretching rod being connected to the air passage of the upper plate, and said joint member being positioned at the top end of said stretching rod.

12. An apparatus for producing hollow molded articles as claimed in claim 3, in which the upper surface of the horizontally movable blow mold is provided with upward facing projections which operatively engage notches on the lower surface of the neck mold to open the latter.

13. An apparatus for producing hollow molded articles as claimed in claim 5, in which the upper surface of the horizontally movable blow mold is provided with upward facing projections which operatively engage notches on the lower surface of the neck mold to open the latter.

14. An apparatus for producing hollow molded articles as claimed in claim 1, in which the mantle is mounted for vertical movement and holds the transferred cooled parison therein for reheating.

* * * * *